Patented Apr. 10, 1945

2,373,488

UNITED STATES PATENT OFFICE 2,373,488

CAST METHYL METHACRYLATE SHEETS

Barnard M. Marks, Newark, N. J., assignor to E. I. du Pont de Nemours & Company, Wilmington, Del., a corporation of Delaware No Drawing. Application April 24, 1942, Serial No. 440,353

2 Claims. (Cl. 260—84)

This invention relates to cast methyl methacrylate sheets and, more particularly, to the composition of the methyl methacrylate syrup used in the production of such sheets.

Cast sheets of polymerized methyl methacrylate are produced by pouring between glass plates separated by a compressible gasket, a liquid composition comprising methyl methacrylate and containing a polymerization catalyst, the assembly then being subjected to polymerizing conditions to convert the liquid composition to a solid polymerized sheet. Usually, there is used a syrup comprising a relatively small proportion of polymerized methyl methacrylate dissolved in monomeric methyl methacrylate. During the course of the polymerization of the methyl methacrylate syrup to form the solid polymer, considerable shrinkage takes place and the purpose of the compressible gasket between the glass plates is to permit these plates to approach each other as the shrinkage takes place. Such a movement of the glass plates occurs only if the composition between the plates adheres sufficiently well to the surface of the glass plates during the contraction of the composition to counteract the effect of the compressible gasket in holding the sheets at the maximum distance provided by the gasket.

In the event that the polymerizing composition does not adhere sufficiently uniformly and sufficiently well to the glass plates during the casting operation, voids are produced in the surfaces of the sheet of cast polymer in areas where the surface of the polymer sheet become separated from the surface of the glass. Such voids are particularly undesirable in transparent cast polymer sheeting since they produce optical distortion.

An object of the present invention is to provide a process of preparing flawless cast polymerized methyl methacrylate sheets. A further object is to provide a methyl methacrylate casting composition which will have increased adhesion to the glass plates during the sheet-casting operation so that voids will not be produced in the surface of the sheet of polymer formed. A still further object is to provide such a casting composition that will not have so much adhesion to the glass plates that the finished cast sheet cannot be readily removed from the glass plates. Other objects will be apparent from the description of the invention given hereinafter.

The above objects are accomplished according to the present invention by disposing a syrup of methyl methacrylate containing 0.001% to 0.015%, by weight of the syrup, of monomeric methacrylic acid, between an assembly of two glass plates separated by a compressible gasket, sealing the assembly and subjecting it to elevated temperature to polymerize the syrup, and thereafter removing the glass plates from the cast sheet thus formed.

It has been discovered that the inclusion of nonomeric methacrylic acid in the casting syrup, within the limits stated, causes sufficient adhesion between the polymerizing mass and the glass plates so that voids are not formed in the surface of the sheet as it is produced and, further, the cast sheet is readily separated from the glass plates. The reason for this highly advantageous result is not clearly understood.

On the basis of careful experimental checking, it is concluded that the proportions of methacrylic acid used in the casting syrup are critical for satisfactory practical operations. If less than the minimum specified proportion of methacrylic acid is used in the casting syrup, the adhesion is not sufficient and, in production, a large percentage of the cast sheets produced will have surface voids.

On the other hand, if methacrylic acid in substantial excess of the maximum amount specified s used, too much adhesion will be obtained and difficulty will be encountered in separating the glass plates from the cast sheet of polymer. In fact, the adhesion may be so great that in separating the cast sheet from the glass plate, the surface of the glass plate will be torn and fragments of glass will remain adhered to the sheet of polymer.

The use of monomeric methacrylic acid is to overcome the lack of adhesion of the polymerizing composition to the glass plates heretofore encountered and is not for the purpose of formng a sheet of interpolymer of methyl methacylate and methacrylic acid to obtain properties in the sheet different from a sheet of straight polymerized methyl methacrylate. If a cast sheet s formed of an interpolymer of methyl methacrylate with sufficient proportion of methacrylate acid to modify appreciably the properties of the sheet, then some form of lubrication of the glass plates must be provided to permit satisfactory separation of the cast polymer from the glass plate. It is very difficult to balance the amount of lubricant so that the proper adhesion is obtained but the present invention is not concerned with the production of cast sheets containing amounts of methacrylic acid sufficient to modify the properties of the sheet.

The following examples are given to illustrate specific embodiments of the invention, all proportions being given by weight unless otherwise specified.

Example I

Methyl methacrylate monomer containing 3% methyl methacrylate polymer, 0.007% methacrylic acid and 0.05% benzoyl peroxide, is poured between glass plates separated by a compressible gasket of such a thickness that after polymerization a sheet 0.250 inch in thickness will be obtained. The assembly is sealed and placed horizontally in an oven at 102° F. for thirty hours. After removal from the oven and cooling, the assemby is placed in water and the temperature raised to 95° C. when the glass may be readily separated from the polymer. A flawless sheet of polymer is obtained containing no surface voids.

Example II

Methyl methacrylate monomer containing 3% methyl methacrylate polymer, 0.013% methacrylic acid, and 0.01% benzoyl peroxide, is poured between glass plates separated by a compressible gasket a distance such that a finished sheet of polymer 0.375 inch in thickness will be obtained, and the assembly is treated as in Example I. A flawless sheet of polymer 0.375 inch in thickness is obtained.

It will be understood that the above examples are merely illustrative and that the invention is in no sense limited to the specific temperatures and times given in the examples nor to the exact procedure set forth. The polymerization of the methyl methacrylate syrup may be induced by using much lower temperatures for a longer period and, although not ordinarily practical for large scale production, may even be carried out at room temperature by subjecting the assembly to direct sunlight. In separating the glass plates, it is customary to raise the temperature of the assembly but the particular temperature employed is not critical nor is it necessary to raise the temperature by placing the assembly in water.

Variations in the composition of the liquid to be cast are permissible. Polymerized methyl methacrylate may be entirely absent from the liquid although those skilled in the art will appreciate a proportion of polymer in the approximate range of 2% to 5%, by weight of the syrup, is highly practical in shortening the time required to polymerize the liquid to a solid sheet. Minor auxiliary ingredients and/or plasticizers may be used to a certain extent, such as coloring matter, usually soluble coloring matter as transparent cast sheets are largely required, and various plasticizers which are normally used in proportions not exceeding 10% by weight of the syrup. The proportion of polymerization accelerator as well as the specific accelerator employed, if any, will be matters familiar with those versed in the manufacture of cast methyl methacrylate sheets.

Since the casting of methyl methacrylate sheets by the use of an assembly of two glass plates and a compressible gasket is used practically to the exclusion of any other method, no details of the assembly are herein given. This procedure is disclosed in Rohm and Bauer, U. S. Patent 2,154,639, patented April 18, 1939.

The proportion of methacrylic acid is given by weight of the complete composition used because the methyl methacrylate casting compositions are normally composed entirely of methyl methacrylate monomer and polymer and far less than 1% of accelerator. However, in the event that auxiliary ingredients such as coloring matter or plasticizers, are used in a relatively large proportion, the amount of methacrylic acid should be determined on the basis of the methyl methacrylate alone.

The present invention provides a method of preparing cast methyl methacrylate sheets free of voids with substantially no additional cost or trouble as compared to the method heretofore used. More specifically, it provides an economical and practical means of avoiding the difficulty heretofore encountered due to lack of adhesion of the polymerizing mass to the glass plates used in forming the cast sheet, without introducing any new complications or disadvantages.

As many apparently widely different embodiments of this invention may be made without departing from the spirit and scope thereof, it is to be understood that the invention is not limited to the specific embodiments thereof except as defined in the appended claims.

I claim:

1. A syrup adapted for forming cast sheets between two glass plates separated by a compressible gasket, said syrup consisting essentially of methyl methacrylate and containing 0.001% to 0.015%, by weight, of methacrylic acid.

2. A syrup adapted for forming cast sheets between two glass plates separated by a compressible gasket, said syrup consisting essentially of methyl methacrylate polymer dissolved in methyl methacrylate monomer and containing 0.001% to 0.015%, by weight, of methacrylic acid.

BARNARD M. MARKS.

CERTIFICATE OF CORRECTION.

Patent No. 2,373,488. April 10, 1945.

BARNARD M. MARKS.

It is hereby certified that error appears in the printed specification of the above numbered patent requiring correction as follows: Page 1, second column, line 8, for "nonomeric" read --monomeric--; line 18, for "rylic" read --crylic; line 27, for "s" read --is--; line 39, for "ng" read --ing--; line 40, for "ylate" read --rylate--; line 43, for "s" read --is--; line 44, for "of methacrylate" read --of methacrylic--; and that the said Letters Patent should be read with this correction therein that the same may conform to the record of the case in the Patent Office.

Signed and sealed this 25th day of September, A. D. 1945.

(Seal)

Leslie Frazer
First Assistant Commissioner of Patents.